J. W. BODIE.
GRASS AND WEED DESTROYER.
APPLICATION FILED SEPT. 20, 1912.
1,054,742.
Patented Mar. 4, 1913.
2 SHEETS—SHEET 1.
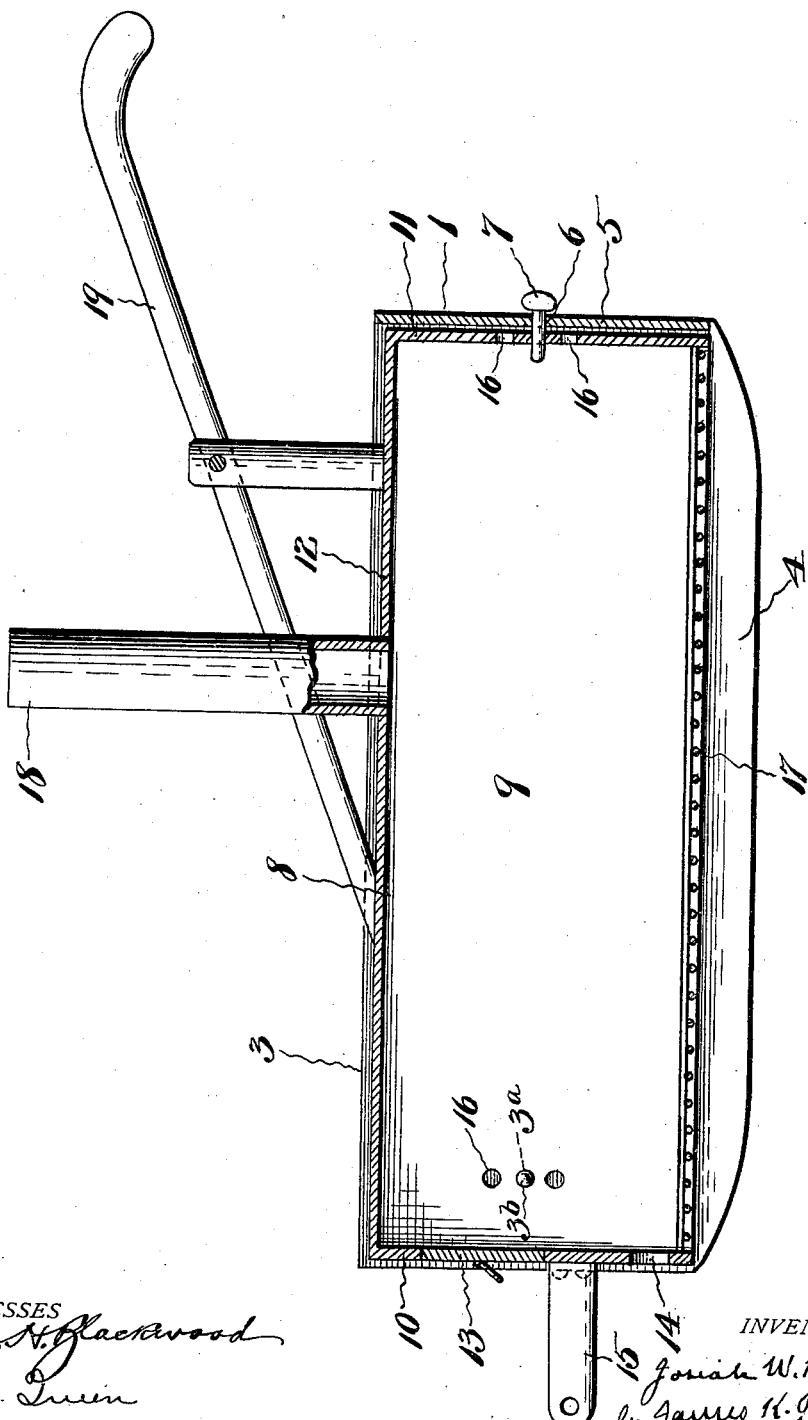
WITNESSES
INVENTOR:
Josiah W. Bodie.
by James K. Polk
Attorney

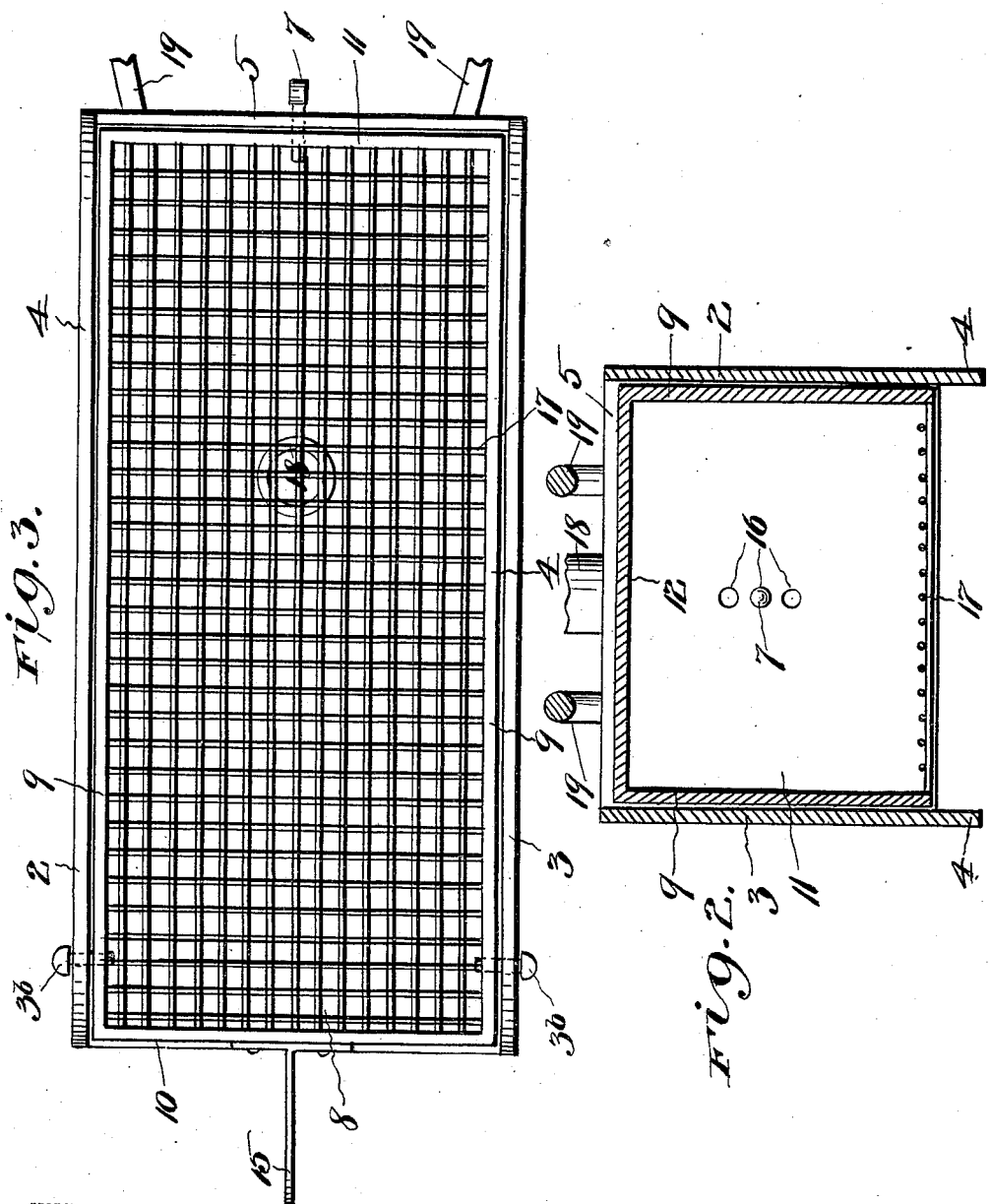

UNITED STATES PATENT OFFICE.

JOSIAH W. BODIE, OF GREENWOOD, SOUTH CAROLINA.

GRASS AND WEED DESTROYER.

1,054,742. Specification of Letters Patent. Patented Mar. 4, 1913.

Application filed September 20, 1912. Serial No. 721,492.

*To all whom it may concern:*

Be it known that I, JOSIAH W. BODIE, a citizen of the United States, and a resident of Greenwood, in the county of Greenwood and State of South Carolina, have invented certain new and useful Improvements in Grass and Weed Destroyers, of which the following is a specification.

My invention relates to an improvement in grass and weed destroyers, and more particularly for use on the farm.

The object of my invention is to provide a device for destroying grass, grass seed, weeds and other undesirable growths.

Another object is to consume, preferably by burning, the grass, weeds or other growth, in addition to destroying them.

A still further object of my invention is to destroy the seed, near the surface of the ground, by burning them before they germinate or grow.

A still further object is to provide a device of the character described which is simple, inexpensive, and durable in construction and easy to operate.

My invention consists in the construction, combination, and arrangement of the several parts, as more fully hereinafter described and claimed.

Referring to the drawings—Figure 1 is a central longitudinal sectional view; Fig. 2, a central transverse sectional view; Fig. 3, a bottom plan view.

In the drawings, in which like reference characters indicate corresponding parts throughout the several views, 1 is the outer casing of the device, which comprises side walls 2 and 3, each provided with a hole $3^a$, designed to receive a pin $3^b$, and each of said sides provided at its lower edge with a runner 4, and a rear wall 5, having a hole 6 therein, designed to receive a pin 7.

Within the outer casing a heater or burner 8 is provided, which comprises side walls 9, front and rear walls 10 and 11, respectively, and a top 12. The front wall 10 is provided with a door 13, draft-openings 14, and a bracket 15, said door being for the purpose of affording means for feeding the burner and said bracket being for the purpose of affording means for attaching a swingletree, double-tree, pole or pair of shafts.

The rear wall 11 and the side walls 9 are each provided with a series of holes 16, designed to receive the pins 7 and $3^b$, respectively, thereby affording means whereby the heater or burner may be adjusted vertically to the desired elevation above the ground. A grate or grid 17 is attached to the lower edges of the walls 9, 10, and 11, on which the fuel, preferably wood, is placed.

The top 12 of the heater or burner is provided with a smoke-stack or flue 18; also, with handles 19, with which to guide the device over the ground. The heater or burner can be adjusted, as has been hereinbefore stated, so as to bring the fire at different elevations with reference to the grass or other growth being burned.

Although I have shown and described runners, wheels may be used in place thereof. The device will preferably be made of sheet-metal, but can be constructed of any suitable material.

In use the fuel is supplied to the heater or burner, through the door 13, and after it has been ignited in any suitable manner and a good hot fire has been produced the heater is slid along the ground on the runners and the grass, weeds or other growths are burned while it is traveling over the same.

I do not wish to be limited to the precise details of construction as herein shown and described, as the same may be varied somewhat without departing from the spirit of my invention and the scope of the following claims.

Having thus described my invention, what I claim is—

1. In a device of the character set forth, a casing having an adjustable heater or burner therein, substantially as shown and described.

2. In a device of the character set forth, a casing, a heater or burner therein, and means for adjusting said heater or burner with relation to the casing, substantially as shown and described.

3. In a device of the character set forth, a casing having runners, an adjustable heater or burner therein, having means for adjusting it with relation to the casing, and a grate, substantially as shown and described.

4. In a device of the character set forth, an outer casing, an adjustable heater or burner therein, having a series of holes and means on the casing for engaging said series of holes, substantially as shown and described.

5. In a device of the character set forth, an outer casing having runners, a heater or burner therein, comprising a casing having a perforated bottom and means for adjusting said heater or burner casing with relation to the outer casing, substantally as shown and described.

6. In a device of the character set forth, an outer casing having holes, an inner casing having a series of holes, pins for engaging the holes in the said outer and inner casings, and a grate in the inner casing, substantially as shown and described.

7. In a device of the character described, an outer casing open at the bottom, a heater or burner within said casing and provided with a perforated bottom, means for allowing the adjustment of the said heater or burner with relation to the outer casing, and means for holding it in its adjusted position, substantially as shown and described.

In witness whereof, I have hereunto set my hand in presence of two subscribing witnesses.

JOSIAH W. BODIE.

Witnesses:
J. W. SPENCE,
H. G. SELLERS.

Copies of this patent may be obtained for five cents each, by addressing the "Commissioner of Patents, Washington, D. C."